(12) United States Patent
Zimmer

(10) Patent No.: US 6,234,037 B1
(45) Date of Patent: May 22, 2001

(54) MODULAR GEAR SYSTEM WITH CONTRATE GEAR

(75) Inventor: Detmar Zimmer, Lemgo (DE)

(73) Assignee: Lenze GmbH & Co KG, Aerzen (DE)

( * ) Notice: Subject to any disclaimer, the term of this patent is extended or adjusted under 35 U.S.C. 154(b) by 0 days.

(21) Appl. No.: 09/463,473

(22) PCT Filed: Jul. 23, 1998

(86) PCT No.: PCT/EP98/04618

§ 371 Date: Apr. 27, 2000

§ 102(e) Date: Apr. 27, 2000

(87) PCT Pub. No.: WO99/06743

PCT Pub. Date: Feb. 11, 1999

(30) Foreign Application Priority Data

Aug. 2, 1997 (DE) .............................. 197 33 546

(51) Int. Cl.[7] .............................. F16H 57/02; F16H 1/14; F16H 1/16

(52) U.S. Cl. .............................. 74/421 A; 74/416; 74/417; 74/606 R

(58) Field of Search .............................. 74/416, 417, 420, 74/421 R, 421 A, 606 R

(56) References Cited

U.S. PATENT DOCUMENTS

| | | | | |
|---|---|---|---|---|
| 1,894,927 | * | 1/1933 | Schmitter | 74/420 |
| 2,910,882 | * | 11/1959 | Wellauer | 74/412 |
| 3,143,897 | * | 8/1964 | Kohn | 74/606 R |
| 3,434,366 | * | 3/1969 | Raso et al. | 74/421 A |
| 3,813,956 | * | 6/1974 | Whitecar | 74/219 |
| 3,993,263 | * | 11/1976 | Lemery et al. | 242/84.21 R |
| 4,811,616 | * | 3/1989 | Henderson | 74/421 |
| 5,058,456 | * | 10/1991 | Manrique et al. | 74/606 R |
| 5,149,311 | * | 9/1992 | Luijten | 74/420 X |
| 5,375,479 | * | 12/1994 | Kouno et al. | 74/421 A X |
| 5,782,133 | * | 7/1998 | Kullborg | 74/420 |

* cited by examiner

*Primary Examiner*—Allan D. Herrmann
(74) *Attorney, Agent, or Firm*—Charles E. Baxley

(57) ABSTRACT

A modular gear system includes a plurality of gear modules and drive modules. The gear modules and drive modules each have a cylindrical output pinion which facilitates connecting the various modules to provide a desired transmission ratio. At least one of the gear modules is an angular gear module which incorporates a contrate gear which can mesh with an output pinion of a drive module or the output pinion of another gear module.

9 Claims, 2 Drawing Sheets

MODULAR GEAR SYSTEM WITH CONTRATE GEAR

BACKGROUND OF THE INVENTION

Field of the Invention

The present invention relates generally to the field of gear systems and more particularly to a modular gear system which includes a contrate gear.

Modular gear systems are typically formed by connecting various gear modules and drive modules to one another to form a gear drive unit which matches the requirements of a given application.

In prior art modular gear systems, the angular gears represent particularly complex components. An additional gear stage with bevel toothing or a worm wheel set is generally provided. In the case of combined bevel and spurgears, an at least two-stage transmission is therefore obtained since there is an input spur wheel set connected to the input of the bevel wheel set and possibly another spur wheel set connected to its output in order, at least to this extent, to standardize its construction with gear modules of a different design. It is likewise always possible for a worm wheel set to be placed ahead of a spur wheel set, for which reason there is often an at least two-stage transmission in this case. Very large transmission ratios can be achieved with such a two-stage transmission of a worm wheel gear.

Contrate gears are also known, which are likewise angular gears and in which a cylindrical pinion interacts with what is referred to as the contrate gear. A gear of this kind is described in the German periodical "antriebstechnik" (Drive Technology), 33 (1994) No. 11, in an article entitled "Cylkro-Getriebe—eine neue Herausforderung" (Cylkro gears—a new challenge). The contrate wheel of such a gear can be described as a rack curved in the form of a circle, the teeth of which are arranged either parallel to the plane of the circle or obliquely to it, the associated cylindrical pinion having a constant geometry along its tooth width and therefore also being immediately suitable for engagement in customary spur wheel toothing. Particularly if a suitable diameter for the contrate wheel is chosen, the contrate wheel gear offers the advantage of a large transmission range, axial freedom of the pinion and any angle of the axes.

OBJECTS AND SUMMARY OF THE INVENTION

It is an object of the present invention to provide a modular gear system which incorporates a simplified angular gear module which can be combined with various gear modules and drive modules.

Another object of the present invention is to provide a gear module which incorporates a contrate gear.

The foregoing and other objects and advantages of the present invention will appear more clearly hereinafter.

In accordance with the present invention there is provided a modular gear system with a contrate gear which includes a plurality of gear modules and drive modules. The gear modules and drive modules each have a cylindrical output pinion which facilitates connecting the various modules to provide a desired transmission ratio. Each of the modules has a housing which includes a mounting flange for removably connecting the housings one to another.

The various gear modules in the modular system include spur gears, parallel-shaft gears, contrate worm gears and combined bevel and spur gears. In the spur gear modules and the parallel-shaft gears the axis of the output shaft is parallel to the output shaft of the respective drive modules combined therewith. In the contrate worm gear modules and the combined bevel and spur gear modules, the output shaft is generally at a right angle to the output shaft of the respective drive module combined therewith.

The drive modules are generally electric motors of various types of construction which can be designated as "flange type" motors.

In addition, there is also the "free-shaft" type of unit where the drive module has an input shaft which can be connected via suitable gear to a separate drive.

DESCRIPTION OF DRAWINGS

The foregoing and other objectives and advantages of the present invention will be apparent from the following detailed description thereof which follows. The description should be read in conjunction with accompanying drawings, in which.

DETAILED DESCRIPTION OF THE INVENTION

Figure 1:
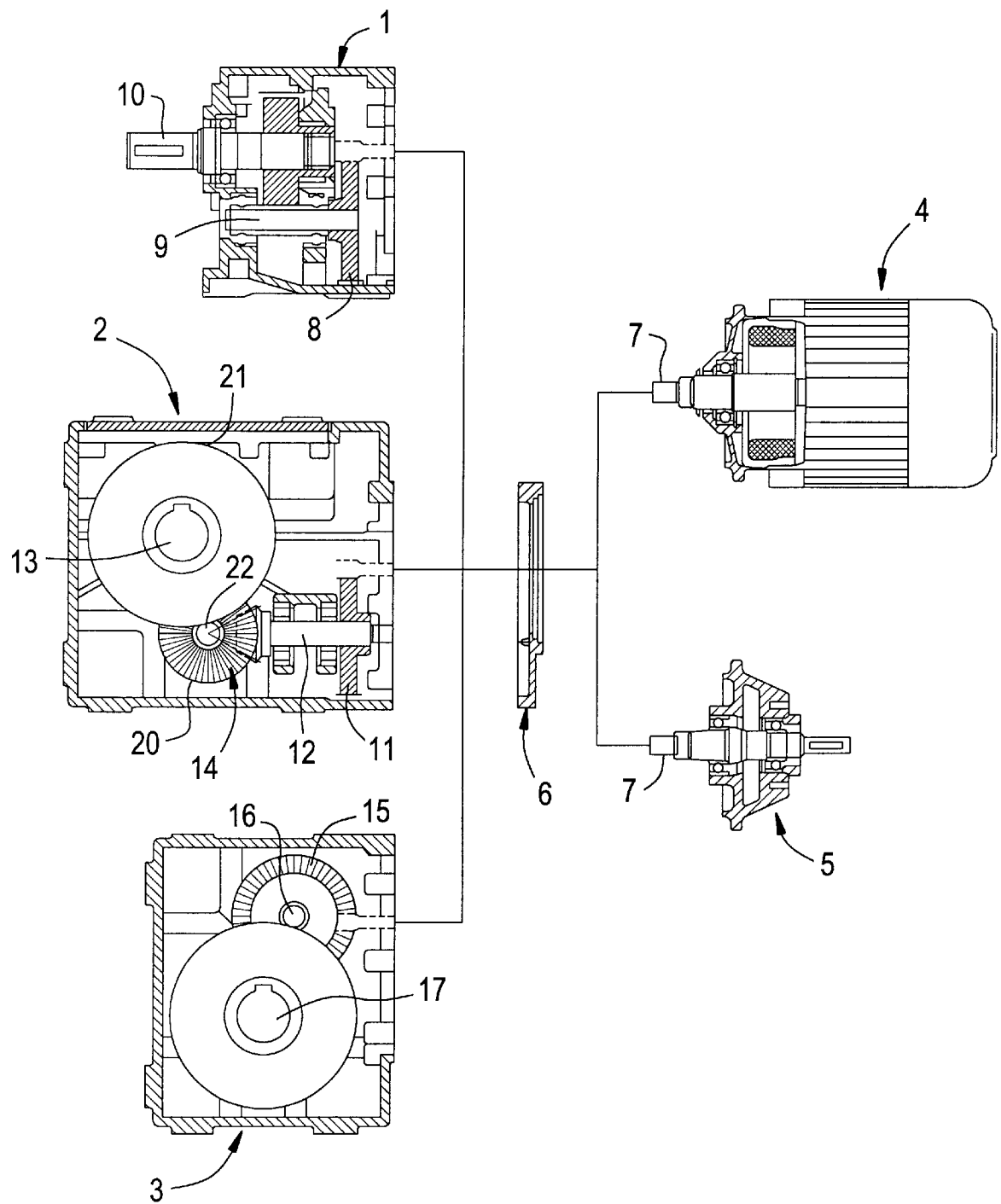
FIG. 1 is an overall cross-sectional view of a modular gear system which incorporates a contrate gear made in accordance with the present invention.
Figure 2:
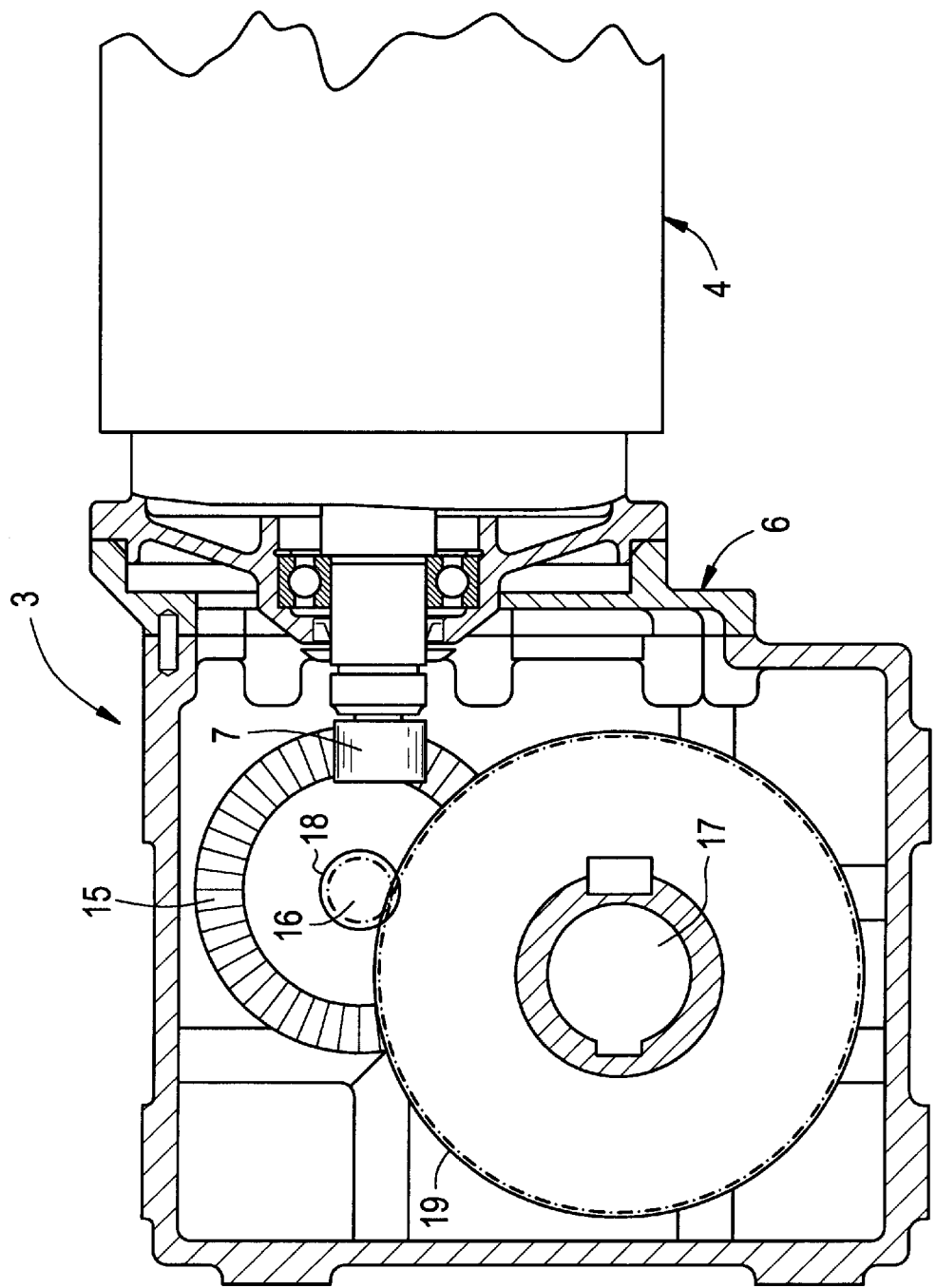
FIG. 2 is a cross-sectional view, drawn to an enlarged scale of a drive module combined with a gear module which incorporates a contrate gear as shown in FIG. 1.

With reference to the drawings, wherein like reference numbers designate like or corresponding parts throughout, there is shown in FIGS. 1 and 2 a modular gear system with a contrate gear made in accordance with the present invention.

The left-hand half of FIG. 1 shows gear modules 1, 2, 3 which can be combined one at a time with drive units 4 or 5. The mechanical connection is provided in each case by a suitable adapter 6 between the respective gear module 1, 2 or 3 and the drive unit 4 or 5.

The drive unit 4 is an electric motor, the output shaft of which has a cylindrical output pinion 7 at the outer, free end. An identical output pinion 7 is also provided on the other drive unit 5, which is a so-called "free shaft" which can be connected to a separate drive (not shown).

The gear module, denoted by reference numeral 1, is a spur gear, to which one of the drive units 4, 5 is flanged in such a way that the cylindrical output pinion 7 meshes with an input spur wheel 8. The shaft 9 of the gear module 1 is connected by further sets of wheels to an output shaft 10, the axis of which is parallel to the input shaft 9 and to the output pinion 7 of the relevant drive unit 4 or 5. The gear module 2 is a combined bevel and spur gear, to which one of the drive units 4, 5 can be flanged in analogous fashion. Here the cylindrical output pinion 7 likewise meshes with an input spur wheel 11 on an input shaft 12, the axis of which is parallel to the output pinion 7 of the drive unit 4, 5. Via a bevel wheel set 14, the input shaft 12 is connected to an intermediate shaft which is connected in turn via another gear wheel set 21, 22 to an output shaft 13 which is disposed at right angles to the input shaft 12 and hence to the driving output pinion 7 of the drive unit 4, 5.

The special feature in the modular gear system according to the present invention is gear module 3, which incorporates a contrate gear 15. In gear module 3, the same cylindrical output pinion 7 of the drive units 4, 5 which in the other gear modules of the modular gear system meshes with an input spur wheel 8 or 11, engages a contrate gear 15, this being more clearly visible in detail in FIG. 2. The cylindrical output pinion 7 of the electric motor of drive unit 4 meshes with the contrate gear 15 which is seated on an intermediate shaft 16, thus providing the right-angled arrangement of an intermediate shaft 16 carrying the contrate gear 15 relative to the axis of the output pinion 7. Parallel to the intermediate shaft 16 there is an output shaft 17, which is connected to the intermediate shaft 16 by a gear set 18, 19. By means of the contrate gear 15, the gear module 3, a large transmission ratio is obtained in a relatively small space, although this is not the crucial point. The important point is, rather, that the contrate gear module 3 increases the number of gears of the different modules within the modular gear system which harmonize with one and the same output pinion 7 of the various drive units 4, 5.

What is claimed is:

1. A modular gear system comprising:

a drive module with said drive module comprising;

a shaft rotatably mounted in said drive module with said shaft having a first end and a second end;

a pinion mounted on said first end of said shaft;

a first gear module, with said first gear module removably connected to said drive module;

at least one pair of gears disposed in mesh and disposed rotatably mounted in said first gear module with one of said gears disposed in mesh with said pinion and with said gear disposed in mesh with said pinion comprising a contrate gear.

2. The modular gear system as claimed in claim 1, further comprising:

a drive motor mounted in said first housing and connected to said second end of said shaft.

3. The modular gear system as claimed in claim 1, further comprising a driving connection formed on said second end of said shaft.

4. The modular gear system as claimed in claim 1, further comprising a flange adapter member, with said flange adapter member disposed between said drive module and said first gear module.

5. The modular gear system as claimed in claim 1, further comprising:

a second gear module, with said second gear module comprising at least one pair of gears disposed in mesh and disposed rotatably mounted in said second gear module, with one of said pair of gears mounted in said second gear module proportioned for meshing with said pinion.

6. The modular gear system as claimed in claim 5, wherein said pair of gears comprises a pair of spur gears.

7. The modular gear system as claimed in claim 5, wherein said second gear module further comprises a pair of bevel gears.

8. The modular sear system as claimed in claim 5, wherein said pair of gears comprises a pair of angular gears.

9. The modular gear system as claimed in claim 5, wherein said pinion comprises a cylindrical pinion.

* * * * *